Sept. 3, 1940.   C. C. KITE   2,213,782

FLAT TIRE DETECTOR

Filed Aug. 31, 1939

Inventor
Claude C. Kite,

By Christian L. Nielsen
Attorney

Patented Sept. 3, 1940

2,213,782

UNITED STATES PATENT OFFICE 2,213,782

FLAT TIRE DETECTOR

Claude C. Kite, Logansport, Ind.

Application August 31, 1939, Serial No. 292,919

6 Claims. (Cl. 200—58)

This invention relates to a flat tire detector and particularly of a construction adaptable to dual tires, and it consists in the constructions, arrangements and combinations herein described and claimed.

It is an object of the invention to provide a signalling means readily attachable to vehicles now in use and in which either or both of the dual tires actuate a switch mechanism for sounding the alarm.

More specifically, it is an object of the invention to provide an actuator lever adapted for positioning between a pair of dual tires, and including adjustable finger members for contacting engagement between the side walls of the tires, thereby regulating the time of actuation of the switch.

It is a still further object of the invention to provide a switch in which the actuator lever may be moved into a position to render the signalling means inoperative, as will be required when removing tires from the wheels of the vehicle.

Additional objects, advantages and features of invention will be apparent from the following description and accompanying drawing, wherein Figure 1 is a rear elevation of dual tires and a portion of the mounting therefor, illustrating my switch installed thereon;

Figure 1:
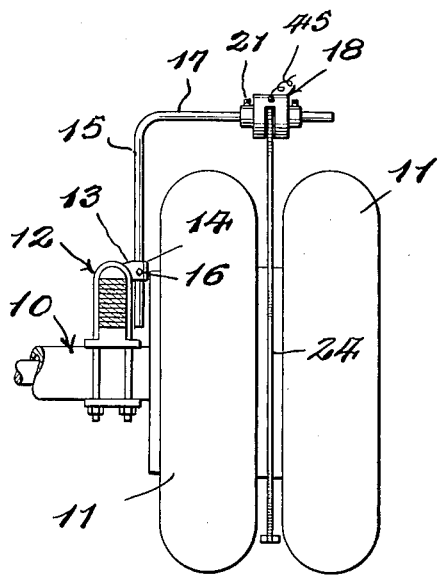
Figure 2:
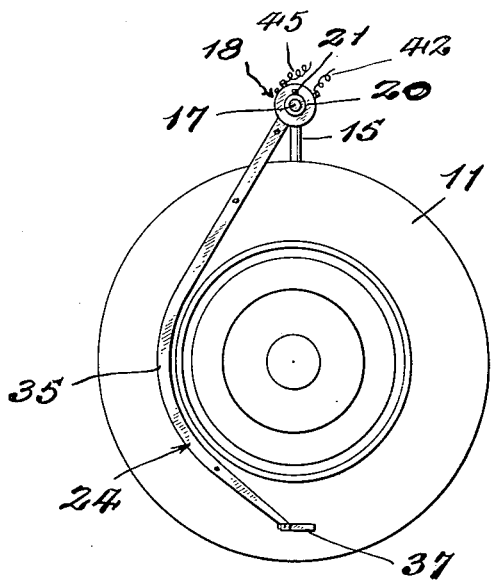
Figure 2 is a side elevation thereof with the outer wheel removed.

There is illustrated in Figures 1 and 2 an axle 10 upon which dual tires 11 are mounted, in side by side spaced relationship, as is customary. The axle embodies a spring and shackle mounting 12 as well understood, which includes a bracket 13 having a vertically disposed collar 14, the latter receiving a standard 15. The standard 15 is vertically adjustable within the bracket and is fixed by means of a set screw 16, or otherwise.

The standard 15 is of a length extending well above the tires 11 whence it is bent at right angles to present an arm 17 lying above the tires. The arm 17 however, stops short of the outer tire so that it will not present any projecting portion beyond the outer side wall of the tire.

Figure 3:
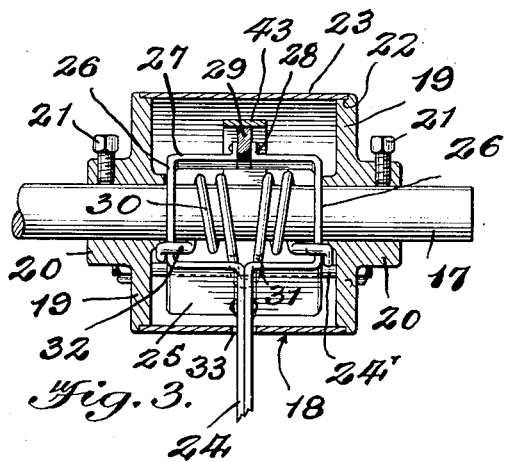
Figure 3 is a longitudinal sectional view through the switch.
Figure 4:
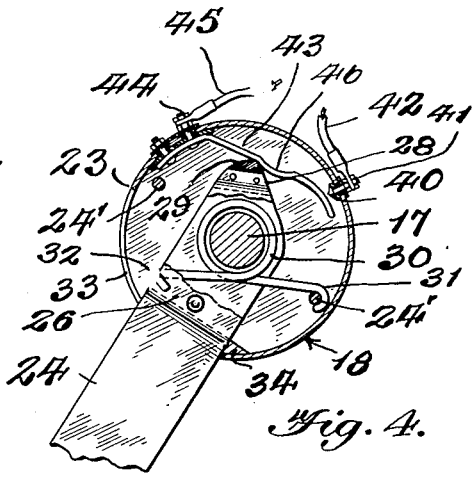
Figure 4 is a fragmentary cross sectional view thereof.
Figure 5:
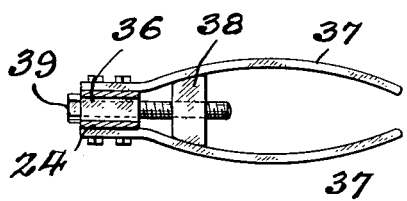
Figure 5 is an enlarged plan view of the tire engaging fingers.

The arm 17 supports a switch 18 as will now be described, attention being invited to Figures 3 and 4 for an understanding of the construction.

The switch 18 is shown as circular, in formation embodying two identically constructed end plates 19. The plates 19 are constructed in the form of a disk, having an enlarged medial outer hub 20 for reception of the arm 17 therethrough, and in order that the housing may be fixed upon the arm, the hub is drilled and tapped to receive a set screw 21, the latter impinging upon the arm 17 when screwed home.

Each plate 19 has a recess 22 upon their opposed faces into which the ends of a circular casing 23 is seated. In order that the plates 19 may be securely retained in position, the end plates are apertured to receive tie bolts 24', which firmly hold the plates 19 against the respective ends of the casing 23, these bolts also serving to mount a spring tension means presently to be described.

An actuator arm 24 is oscillatably mounted upon the arm 17, and as shown comprises a pair of elongated steel straps arranged in parallel, longitudinal relation, the upper ends of which are bent at right angles as at 25, in opposite directions, thence bent at right angles to define side walls 26. The side walls 26 are apertured to receive the arm 17 therethrough and are then bent to present portions 27 parallel to the members 25. The portions 27 of the strap stop short of each other and each is provided with parallel opposed lugs 28. Between the lugs 28 an insulated wiper block 29 is positioned and held in place by rivets or otherwise. It will be thus seen that the arm 24 is oscillatably mounted upon the arm 17.

A tension spring 30 is mounted upon the arm 17 functioning to hold the arm 24 in inoperative position, and to this end the spring 30 comprises a bight 31 intermediate the ends of the spring, adapted to engage one of the rods 24'. A suitable number of helices are employed upon either side of the bight 31, respective ends of the spring being anchored upon the upper or outer edges of the side walls 26, as at 32.

The casing 23 has a slot 33 extending circumferentially a suitable distance, through which the arm 24 projects and may partake of the necessary oscillating movements. The lower edge of the slot 33 acts as a stop for the arm 24 and if desired, the casing 23 may be reinforced, as at 34.

The arm 24 is presented between the dual wheels 11 and extends forwardly approximately to a point in the vertical axis of the wheels, and in order that this may be attained, the arm 24 is given a slight curvature as at 35, so as to lie slightly spaced from the connecting hub of the dual wheels.

At the lower ends of the straps defining the arm 24 a spacer block 36 is fixed by means of suitable fastenings, and these fastenings also secure a pair of spring fingers 37. The fingers 37 are outwardly bowed and lie in a position between the tires of the dual wheels so as to be contacted thereby when either or both of the tires becomes deflated to an undesirable extent.

In order that the setting or position of these fingers may be varied, a wedge block 38 is arranged between the fingers in advance of the spacer block 36. The wedge block 38 has a threaded aperture for reception of a threaded stud 39 revolubly mounted in the spacer block 36. The wedge block 38 preferably has faces complemental to the fingers 37 and it will be apparent that by moving the block 38 longitudinally of the fingers, the spacing thereof may be varied, which is essential to accommodate various sized tires as well as to vary the time at which the signal is to be given.

Within the housing 23 an insulated contact 40 is mounted, having a stud 41 exteriorly thereof for connection of an electric lead 42.

Also mounted within the housing 23 there is a spring contact arm 43, one end of which is fixed to the housing, but insulated therefrom. A stud 44 is electrically connected to the spring arm 43 but insulated from the casing, the stud 44 also forming connection for a lead 45. The leads 42 and 45 are connected in any suitable circuit with a source of current and signal device, either visual or audible.

The spring contact arm 43 is of a length to extend beyond the contact 40 which normally lies spaced above, and the arm includes a cam portion 46 intermediate its length for engagement by the wiper block 29 of the arm 24.

In use, with the switch installed as described, should either or both of the tires become deflated or partly so, the tire or tires will tend to spread laterally, causing the adjacent side wall or walls to frictionally engage the fingers 37. Such engagement will cause a rearward movement of the arm 24, as seen in Figure 2, bringing the wiper block 29 against the cam 46 with consequent movement of the spring arm 43 into engagement with the contact 40, closing the circuit to the signal means. As soon as the tire has been inflated, or repaired, the spring 30 will return the arm 24 to normal position.

When it is desired to change a tire or wheel, the arm 24 may be swung fully upward so that the wiper block 29 passes the cam 46 allowing the contact spring 43 to move rearwardly away from the contact 40 and thus there is no liability of energizing the signal means.

While I have shown and described a preferred construction, this is by way of illustration only, and I consider as my own all such modifications in structure as fairly fall within the scope of the appended claims.

I claim:

1. A flat tire detector for dual tires comprising a bracket positioned above the tires, a switch means carried thereby, said switch comprising an oscillatable actuator arm positioned between the tires, said arm having frictional contact with the tires when under-inflated whereby to oscillate the arm to actuate the switch during rotation of the tires.

2. A flat tire detector for dual tires comprising a bracket positioned above the tires, a switch means carried thereby including a pair of binding posts for an electrical signal circuit, a switch arm electrically connected to one of the binding posts and normally spaced from the other binding post, an oscillatable actuator arm carried by the switch having contacting engagement with the switch arm, spring means for holding the actuator arm in normal position, said arm being positioned between the tires and having frictional contacting engagement with the tires upon loss of air therefrom, whereby to actuate the arm to move the switch arm into engagement with the last named binding post.

3. The structure of claim 2 in which the actuator arm includes adjustable spring fingers for establishing the frictional engagement with the tires.

4. A flat tire detector for dual tires comprising attaching bracket having an arm extended at right angles above the tires, a casing fixed to the arm, an actuator arm having one end oscillatably mounted on the arm and positioned within the casing, the casing having a slot formed in its circumference and through which the actuator arm is extended, the terminations of the slots serving to limit movement of the actuator arm, said actuator arm having a length and curvature to present the free end thereof between the dual tires, adjustable spring fingers carried by the free end of the actuator arm adapted to frictionally engage the side walls of the tires when under-inflated; a spring switch arm fixed at one end within the casing, an electrical contact adjacent the free end of the switch arm, a binding post for the contact, a second binding post electrically connected to the switch arm, spring means for holding the actuator arm in normal inoperative position but yieldable to force imparted to the actuator arm by the tires, and said actuator arm having a wiper block cooperable with said spring switch arm whereby to move the switch arm into engagement with said contact.

5. The structure of claim 4 in which the adjusting means for the spring fingers comprise a wedge block between the fingers and screw threaded means for moving the block longitudinally of the fingers.

6. The structure of claim 4 in which the switch arm comprises a cam portion complemental to said wiper block.

CLAUDE C. KITE.